United States Patent [19]

Sholes, Jr. et al.

[11] 3,878,376
[45] Apr. 15, 1975

[54] COMPUTER OPERATED SOLENOID VALVE PRESSURE CONTROL SYSTEM

[75] Inventors: Frederick Gordon Sholes, Jr.; Gary Eugene Lovell, both of Littleton, Colo.

[73] Assignee: Martin Marietta Corporation, New York, N.Y.

[22] Filed: Dec. 17, 1973

[21] Appl. No.: 425,663

[52] U.S. Cl....... 235/151.34; 73/205 R; 137/624.11
[51] Int. Cl.......................... G06f 15/20; G01p 5/14
[58] Field of Search......... 235/151.2, 151.3, 151.34, 235/151.1; 73/197, 205, 211; 137/624.11, 624.12, 624.18

[56] References Cited
UNITED STATES PATENTS

| | | |
|---|---|---|
| 3,555,901 | 1/1971 | Delatorre et al................. 73/205 X |
| 3,741,246 | 6/1973 | Braytenbah.................... 137/624.11 |
| 3,752,393 | 8/1973 | Moseley............................ 73/211 X |
| 3,794,070 | 2/1974 | Klem et al. ................ 137/624.11 X |

Primary Examiner—Joseph F. Ruggiero
Attorney, Agent, or Firm—Sughrue, Rothwell, Mion, Zinn & Macpeak

[57] ABSTRACT

A computer operated solenoid valve pressure control system is disclosed. The apparatus of the system includes a computer, equipment which converts the computer instructions to electrical power to operate solenoid valves which with associated components pressurize or depressurize a closed volume, and a pressure measuring system which provides feedback to the computer. In applications where the pressurized device varies in volume or there is flow through the pressurized device, the pressure from the closed volume is fed to a pilot regulator system.

16 Claims, 2 Drawing Figures

COMPUTER OPERATED SOLENOID VALVE PRESSURE CONTROL SYSTEM

BACKGROUND OF THE INVENTION

This invention relates to systems for controlling pressures, and more particularly to a computer controlled solenoid valve pressure system.

Fluid pressure control systems are utilized in, for example, automatic control of test equipment and in automated industrial applications where fluid pressure is used as stimulus or as a control signal for other devices such as pressure, flow, and temperature regulators. The prior art pressure control systems often utilized for automated control of test equipment or for automated industrial applications are systems employing electronically operated motors to set regulators or systems that employ an electronic device to send reference current to a device such as a servo valve. These prior art systems are often slow, complex, costly and have a low reliability.

This invention provides a pressure control system that is computer controlled. The system is relatively fast acting and has a high degree of reliability. Further, the system of this invention is not a complex system; and when incorporated with apparatus that has an existing computer, the system is very low cost in comparison to many of the prior systems. While this invention may be used in many automated test systems or automated industrial processes, it is ideally suited for use with the automatic jet engine accessory test system disclosed in a co-pending U.S. Pat. application Ser. No. 425,649, filed on Dec. 17, 1973, by Gary E. Lovell and William J. Wise and assigned to the assignee of this invention.

SUMMARY OF THE INVENTION

The computer controlled solenoid valve pressure system of this invention includes means to translate instructions from a computer to electrical signals to operate solenoid valves. The valves, in conjunction with other apparatus of the system, pressurize or depressurize a closed volume. A pressure measuring system provides feedback to the computer.

The desired pressure is fed to the computer by the program. The computer is programmed to measure existing pressure, select a valve, and compute the time this valve must be open to obtain the desired pressure. A digital counter converts a time valve signal in digital form from the computer to a signal of specified time duration by counting impulses from a time reference clock. A solenoid address register connects this signal of specified time duration to the selected solenoid valve driver to open the selected valve for a specified time.

BRIEF DESCRIPTION OF THE DRAWING

The exact nature and specific details of the invention will be apparent from the following detailed description of the invention when read in conjunction with the annexed drawing in which.

DETAILED DESCRIPTION OF THE INVENTION

Figure 1:
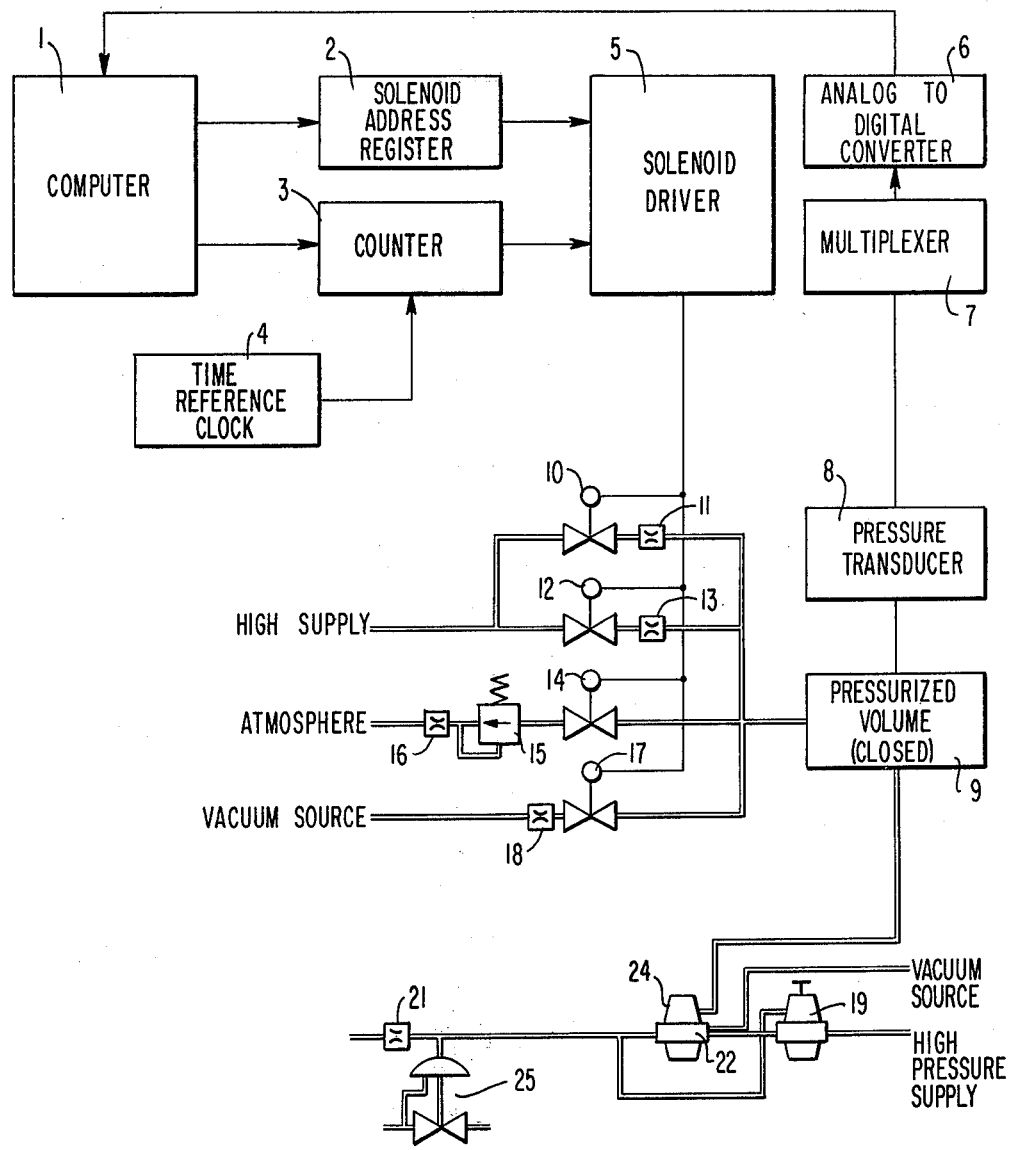
FIG. 1 shows a preferred embodiment of the invention with a pilot regulator system necessary only for special specific applications.

Referring to FIG. 1, a computer 1 is connected to a solenoid address register 2 and to a digital counter 3. A time reference clock 4 is connected to counter 3. A solenoid driver 5 is connected to the output of solenoid address register 2 and to the output of counter 3. The output of solenoid driver 5 is connected to the solenoid valves 10, 12, 14 and 17. Valve 10 has an associated orifice 11. Valve 12 has an associated orifice 13. Valve 17 has an associated orifice 18 and valve 14 has an associated pressure regulating valve 15 and orifice 16. All the valves and associated orifices are fluid coupled to a pressurized closed volume 9 as shown in FIG. 1. Valves 10 and 12 are fluid coupled to a high pressure supply and valves 14 and 17 are fluid coupled to the atmosphere and a vacuum source, respectively.

Closed volume 9 is connected to a pressure transducer 8 which in turn is connected to a multiplexer 7. The output of multiplexer 7 is connected to an analog to digital converter 6 and the output of analog to digital converter 6 is connected to computer 1.

The desired pressure in pressurized closed volume 9 is an input to computer 1 in a program. Computer 1 is programmed to measure the existing pressure in pressurized closed volume 9 and compare this pressure to the desired pressure. In response to this comparison, computer 1 selects which of the valves 10, 12, 14 and 17 must be opened to obtain the desired pressure and computes the length of time this valve must be open to attain this desired pressure. After computing the time the appropriate valve must be open, computer 1 applies a digital time measure signal to digital counter 3. Counter 3 converts this digital time measure signal from computer 1 to a specified time duration signal by counting impulses from time reference clock 4. This signal of specified time duration is applied to solenoid driver 5. During the same time, computer 1 provides a valve select signal to solenoid address register 2. Solenoid address register 2, in response to this select signal from computer 1, transmits a signal to solenoid driver 5 to energize the proper solenoid by the signal from counter 3. Thus, address register 2 in combination with counter 3 energizes the proper solenoid for the specified time so that the proper valve will be open for the proper amount of time to attain the desired pressure in pressurized closed volume 9.

If computer 1 indicates that the pressure in closed volume 9 is to be increased, either valve 10 or valve 12 will be opened for the specified time. The valve 10 and 12 and their associated orifices 11 and 13 provide two ranges of fluid flow to closed volume 9. Computer 1 selects which of the two valves 10 and 12 will be opened and thus selects which of the fluid flow ranges is selected for a given condition.

Computer 1 has a built in programmed delay to allow the pressure in pressurized closed volume 9 to stabilize. At the end of this delay period, computer 1 by means of transducer 8, multiplexer 7 and analog to digital converter 9 measures the pressure and if any correction is necessary provides the appropriate signals to solenoid address register 2 and counter 3. If a high degree of accuracy is required, either orifice 11 or orifice 13 or both could be made very small so that a slow rate of change is provided.

The above discussion of the operation relates to the increasing of the pressure in pressurized closed volume 9. Valves 14 and 17 are provided to permit decreasing the pressure in closed volume 9. When the pressure in closed volume 9 is above atmospheric pressure and computer 1 determines that the pressure is to be decreased, computer 1 sends the appropriate select signal to address register 2 to select valve 14. At the same time, computer 1 sends the time signal, indicative of the time valve 14 is to be open, to counter 3 which in turn applies a signal of specified time duration to solenoid driver 5 to open valve 14 for the specified time. The fluid in closed volume 9 is then vented to the atmosphere until the time necessary to attain the desired pressure in closed volume 9 has lapsed. After this period of time valve 14 is, of course, closed. Again, computer 1 measures the pressure in closed volume 9 and makes any necessary corrections.

If the pressure is vented directly to the atmosphere through valve 14 and orifice 16, it is obvious that the rate of fluid flow from closed volume 9 to the atmosphere will be a function of the pressure differential. Therefore, if the pressure in closed volume 9 is substantially higher than atmospheric pressure, the initial flow rate will be high and will decrease as the two pressures approach equalization. However, a nearly constant pressure decrease rate can be otained by a pressure regulating valve such as pressure regulating valve 15. Pressure regulating valve 15 keeps the pressure on the upstream side of orifice 16 at a constant value, thus providing a constant flow rate since the downstream side of orifice 16 is at atmospheric pressure.

Figure 2:
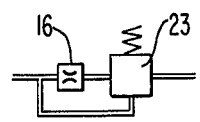
FIG. 2 shows a flow controller that can be used with the system of FIG. 1.

An alternate method of achieving a constant flow rate is shown in FIG. 2. FIG. 2 shows a flow controller 23 used with the orific 16. In other words, flow controller 23 of FIG. 2 is substituted for pressure regulating valve 15 of FIG. 1. Flow controller 23 provides a constant flow rate by maintaining a constant pressure change across orifice 16. Utilization of flow controller 23 provides improved accuracy over the use of pressure regulating valve 15 where there are variations in the atmospheric pressure.

The pressure in pressurized closed volume 9 can also be decreased by venting the pressure through valve 17 and orifice 18. The downstream side of orifice 18 is coupled to a vacuum source. Valve 17 is operated in the same manner as valves 14, 12 and 10. That is, computer 1 selects this valve and solenoid driver 5 opens this valve and holds it open for a given length of time set by computer 1 through counter 3. Since the downstream side of orifice 18 is coupled to a vacuum source, it is obvious that the pressure in pressurized closed volume 9 can be decreased below atmospheric pressure by opening valve 17 and maintaining it open long enough for the pressure in closed volume 9 to reduce to the desired sub-atmospheric level.

As was mentioned above, for very small pressure changes the orifice is made very small. Similarly if small pressure increments are required, the orifices must be so placed as to minimize the volume between the valve seat and the orifice. This can be accomplished by selecting a valve with an orifice coefficient equal to the required one, thus eliminating the external orifice or by pressing a bushing with the correct orifice into the valve body.

If this invention is to be used in a system where the pressurized device varies in volume or where there is flow through the pressurized device, a pilot regulating system is coupled between pressurized closed volume 9 and the pressurized device. Such a pilot regulator is shown in FIG. 1. As shown in FIG. 1, the pilot regulator system comprises an air loaded regulator 24. Regulator 24 is conventional air loaded regulator having an exhaust ring 22 and replaces the function of a conventional spring regulator. Air loaded regulator 24 is coupled to closed volume 9 and to the device being pressurized through an orifice 21. The regulated output of regulator 24 is equal to the loading pressure. In order to regulate sub-atmospheric pressures, a vacuum source is coupled to exhaust ring 22 of regulator 24. A second regulator 19 is coupled between regulator 24 and a high pressure supply. Regulator 19 is provided to maintain approximately a 20 psi drop across regulator 24. This controlled drop across regulator 24 by regulator 19 is necessary to prevent excessive flow to the vacuum source which would occur when there is a large pressure drop across regulator 24. A variable volume control 25 connected just upstream from orifice 21 completes the pilot regulator system.

While the invention has been described with reference to a specific embodiment, and the modification of FIG. 2, and the addition of a pilot regulator system where required, it will be obvious to those skilled in the art that various other changes and modifications can be made to this specific embodiment without departing from the spirit and scope of the invention as defined in the claims.

What is claimed is:

1. A computer operated solenoid valve pressure control system comprising:
   a. a computer;
   b. a pressurized closed volume;
   c. means coupled to said pressurized closed volume for measuring the pressure in said pressurized closed volume;
   d. means coupled between said means for measuring said pressure in said pressurized closed volume and said computer for transmitting a signal indicative of said pressure in said pressurized closed volume to said computer;
   e. solenoid operated valve means coupled to said pressurized closed volume to change the pressure in said pressurized closed volume;
   f. a solenoid driver coupled to said valve means;
   g. a solenoid address register coupled between said computer and said solenoid driver;
   h. a counter coupled between said computer and said solenoid driver; and
   i. a time reference clock coupled to said counter, whereby said valve means is caused to open by an address read into said register from said computer for a time period determined by said counter counting impulses from said time reference clock to thereby change said pressure in said pressurized closed volume.

2. A computer operated solenoid valve pressure control system as defined in claim 1 wherein said valve means comprises a plurality of valves, each having an associated orifice.

3. A computer operated solenoid valve pressure control system as defined in claim 2 wherein said plurality of valves includes a first solenoid operated valve coupled between a source of high pressure and said pressurized closed volume.

4. A computer operated solenoid valve pressure control system as defined in claim 3 wherein said plurality of valves includes a second solenoid operated valve coupled across said first solenoid operated valve.

5. A computer operated solenoid valve pressure control system as defined in claim 4 wherein said plurality of valves includes a third solenoid operated valve coupled between said pressurized closed volume and the atmosphere.

6. A computer operated solenoid valve pressure control system as defined in claim 5 wherein said plurality of valves includes a fourth solenoid operated valve coupled between a vacuum source and said pressurized closed volume.

7. A computer operated solenoid valve pressure control system as defined in claim 6 wherein said means to measure said pressure in said pressurized closed volume is a pressure transducer.

8. A computer operated solenoid valve pressure control system as defined in claim 7 wherein said means for transmitting a signal indicative of said pressure in said pressurized closed volume comprises: a multiplexer coupled to said pressure transducer and an analog to digital converter coupled between said computer and said multiplexer.

9. A computer operated solenoid valve pressure control system as defined in claim 5 wherein a pressure regulator is coupled between said third solenoid operated valve and said atmosphere.

10. A computer operated solenoid valve pressure control system as defined in claim 5 wherein a flow controller is coupled between said third solenoid operated valve and said atmosphere.

11. A computer operated solenoid valve pressure control system as defined in claim 1 wherein a pilot regulator system is coupled between said pressurized closed volume and a device that is to be pressurized.

12. A computer operated solenoid valve pressure control system as defined in claim 9 wherein a pilot regulator system is coupled between said pressurized closed volume and a device that is to be pressurized.

13. A computer operated solenoid valve pressure control system as defined in claim 10 wherein a pilot regulator system is coupled between said pressurized closed volume and a device that is to be pressurized.

14. A computer operated solenoid valve pressure control system as defined in claim 11 wherein said pilot regulator comprises: a first air loaded pressure regulator coupled between said pressurized closed volume and said device that is to be pressurized, said first air loaded pressure regulator having an exhaust ring; a vacuum source coupled to said exhaust ring; a second air loaded pressure regulator coupled between a high pressure source and said first air loaded pressure regulator; and a variable volume control device coupled to the downstream side of said first air loaded pressure regulator.

15. A computer operated solenoid valve pressure control system as defined in claim 12 wherein said pilot regulator comprises: a first air loaded pressure regulator coupled between said pressurized closed volume and said device that is to be pressurized, said first air loaded pressure regulator having an exhaust ring; a vacuum source coupled to said exhaust ring; a second air loaded pressure regulator coupled between a high pressure source and said first air loaded pressure regulator; and a variable volume control device coupled to the downstream side of said first air loaded pressure regulator.

16. A computer operated solenoid valve pressure control system as defined in claim 13 wherein said pilot regulator comprises: a first air loaded pressure regulator coupled between said pressurized closed volume and said device that is to be pressurized, said first air loaded pressure regulator having an exhaust ring; a vacuum source coupled to said exhaust ring; a second air loaded pressure regulator coupled between a high pressure source and said first air loaded pressure regulator; and a variable volume control device coupled to the downstream side of said first air loaded pressure regulator.

* * * * *